(No Model.)

J. N. BAER & J. S. EDWARDS.
VENTILATOR FOR SHOW WINDOWS.

No. 323,387. Patented Aug. 4, 1885.

Attest
Homer A. Herr.
James Barber.

Inventors
John N. Baer
Jesse S. Edwards
By their atty.

UNITED STATES PATENT OFFICE.

JOHN N. BAER AND JESSE S. EDWARDS, OF PHILADELPHIA, PA.

VENTILATOR FOR SHOW-WINDOWS.

SPECIFICATION forming part of Letters Patent No. 323,387, dated August 4, 1885.

Application filed January 10, 1885. (No model.)

*To all whom it may concern:*

Be it known that we, JOHN N. BAER and JESSE S. EDWARDS, both of the city and county of Philadelphia, and State of Pennsylvania, have invented an Improvement in Bulk and Show Windows, of which the following is a specification.

Our invention has reference to bulk or show windows; and it consists in certain improvements, fully set forth in the following specification, and shown in the accompanying drawings, which form part thereof.

The object of our invention is to so construct a bulk or show window that a draft of cold dry air may be caused to circulate positively through the same, and particularly so as to pass over the inner surface of the glass, for the purpose of preventing the formation of frost, ice, and sweat, which productions prevent persons on the street from viewing the contents of the bulk or show window. In cold weather particularly are shop-keepers and merchants annoyed by this opaque coating appearing upon their windows, and as this includes the holiday season, when most sales are made, it is most important to devise some adequate means to prevent the formation of frost, ice, or sweat, and practical use of our invention has thoroughly demonstrated beyond a question of doubt that these formations can be entirely prevented. By our construction of bulk or show windows the air-currents are of great magnitude, and caused to pass close to the whole surface of the glass, and they may be regulated by suitable valves. In addition to this, the air is thoroughly purified, no dust or insects being allowed to enter. In practice we have found it is so perfect in its action that if the air-currents be shut off and the bulk made to contain moist air so as to form ice or frost or sweat, and the air-currents then set in motion by opening the valves, the glass will soon be freed from said frost, ice, or sweat, and an observer can perceive its dissipation, as it takes place so rapidly, and ultimately the glass is left as clear as if washed and polished.

Figure 1:
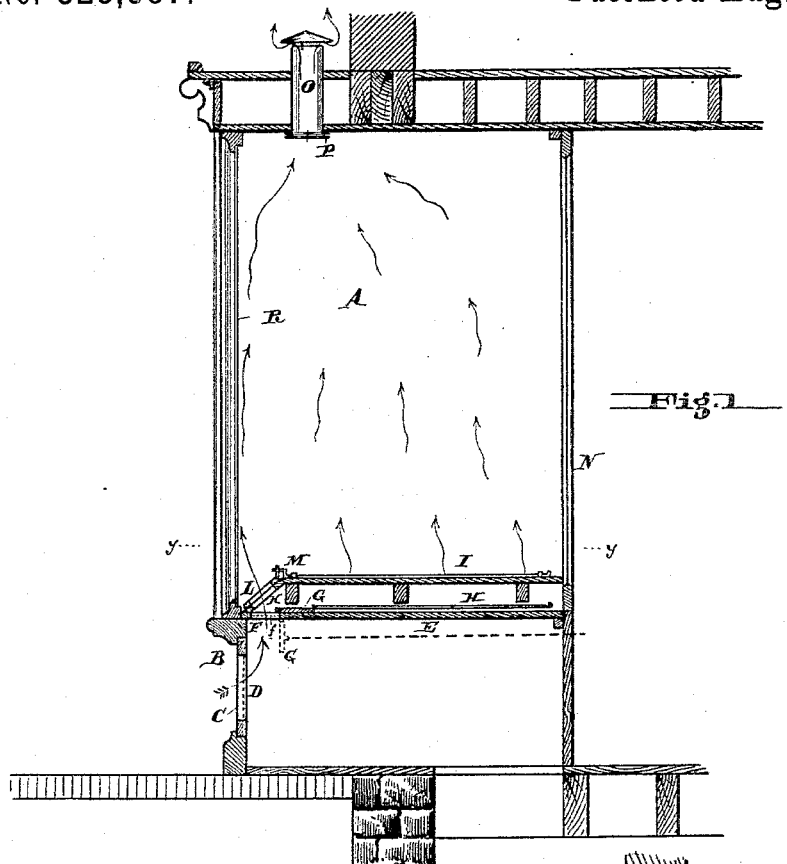
Figure 2:
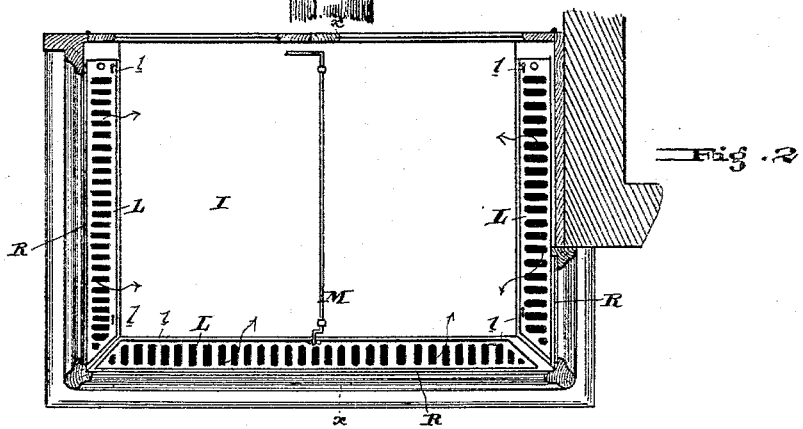
Figure 3:
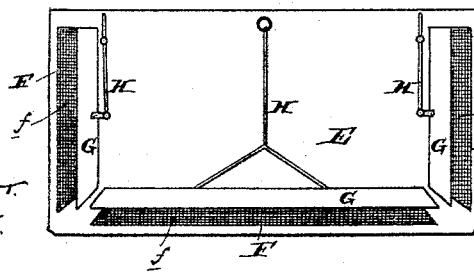

In the drawings, Figure 1 is a sectional elevation of a bulk or show window, on line X X, embodying our improvements. Fig. 2 is a sectional plan view of same on line Y Y, and Fig. 3 is a plan view of the bulk-floor removed to show the screened air-passages.

A is the bulk-window, and is shown with three of its sides provided with glass, R, and the back or inner side formed with doors N, which should be preferably made tight, to prevent warm air from the store passing into the bulk.

B is the base of the bulk, and is provided with suitable ornamented air passages or openings, C, preferably covered with screens D, to prevent the passage of insects or birds or persons on the street tampering with the floor of the bulk. If desired, these openings may be dispensed with, and the air to the bulk supplied from the cellar, if the same be cold.

E is the main floor of the bulk, and may be made removable, (see Fig. 3,) and is formed with long slots or openings F along the edges adjacent to the glass of the windows, which openings are shown as furnished with a very fine netting or gauze, *f*, by which dust and small insects are prevented from passing into the bulk among the goods on exhibition. These openings F may be provided with valves G, which may slide and be operated by rods H, or they may be hinged, as indicated in dotted lines, it being immaterial to our invention how they are made or operated.

I is the raised floor, which it is most desirable, though not necessary, to use, and the edges next to the glass are made oblique and provided with slots or openings K, over which slatted or gridiron valves L may work, so as to control the size of the openings and consequent degree of draft. These valves may be guided on pins *l*, and may be operated by a cranked rod, M, cords, or directly by the hand. If desired, the floor E may be dispensed with, and the openings F formed below the openings K, or these openings may simply be covered with wire-gauze; and, on the other hand, the raised floor I may be dispensed with, and the floor E made with regulating-valves; and while we prefer the construction shown, it is self-evident that the result desired might be attained by the use of the openings F and valves G alone. Therefore we do not limit ourselves to the details shown. The roof of the bulk or show window is provided with one or more ventilators, O, preferably provided with regulating-valves, though these are not specially required, as the regulation of air-currents is fully controlled from below.

Having now described our invention, what we claim as new, and desire to secure by Letters Patent, is—

1. The combination, in a bulk or show window, of the floor I, having oblique edges provided with air-passages K and sliding grate-valves L, adapted to direct the air-currents against the lowermost part of the glass window, guides for the grate-valves, and cranked rod M, substantially as and for the purpose specified.

2. The combination, in a bulk or show window, of the floor E, having passages F, screens $f$, valves G, floor I, having openings K, valves L, and ventilator-openings O in the roof, substantially as and for the purpose specified.

3. The combination, in a bulk or show window, of the substantially horizontal floor I, having inclined openings K, formed like gratings, grate-valves L, and ventilating-openings opening from the roof of said window, substantially as and for the purpose specified.

In testimony of which invention we hereunto set our hands.

JOHN N. BAER.
JESSE S. EDWARDS.

Witnesses:
R. M. HUNTER,
WILLIAM C. MAYNE.